United States Patent [19]

Yanabu et al.

[11] 4,307,428

[45] Dec. 22, 1981

[54] CIRCUIT BREAKER APPARATUS FOR HIGH VOLTAGE DIRECT CURRENTS

[75] Inventors: Satoru Yanabu, Machida; Toru Tamagawa, Chigasaki; Susumu Nishiwaki, Yokohama, all of Japan

[73] Assignee: Tokyo Shibaura Denki Kabushiki Kaisha, Kawasaki, Japan

[21] Appl. No.: 70,635

[22] Filed: Aug. 28, 1979

[30] Foreign Application Priority Data

Sep. 9, 1978 [JP] Japan ............................ 53-110982

[51] Int. Cl.³ ............................ H02H 7/22

[52] U.S. Cl. ............................ 361/4; 361/3

[58] Field of Search ............................ 361/4, 3, 8, 13, 2, 361/5, 6, 7; 307/134, 135, 137, 138

[56] References Cited

U.S. PATENT DOCUMENTS

| | | | |
|---|---|---|---|
| 2,610,231 | 9/1952 | Wettstein | 361/4 |
| 3,475,620 | 10/1969 | Murray et al. | 361/4 |
| 4,172,270 | 10/1979 | Kiyokuni et al. | 361/156 X |

FOREIGN PATENT DOCUMENTS

| | | | |
|---|---|---|---|
| 2004139 | 3/1979 | United Kingdom | 361/4 |
| 494783 | 2/1976 | U.S.S.R. | 361/4 |

OTHER PUBLICATIONS

Panel Session On "Prospects for Multiterminal H.V.D.C. Transmission Status of DC Interrupting Devices", by Breuer, et al., General Electric Co., 1977, Summer Meeting, Mexico City.

*Primary Examiner*—Patrick R. Salce

*Attorney, Agent, or Firm*—Oblon, Fisher, Spivak, McClelland & Maier

[57] ABSTRACT

A circuit breaker apparatus of high voltage direct currents is connected in series with an external circuit comprising an AC-DC converting device connected to an AC power supply and a DC reactor connected to the AC-DC converting device, and comprises a circuit breaker connected in series with the external circuit, a disconnecting switch connected to the circuit breaker, and a series circuit connected in parallel with the circuit breaker and constituted of a blocking capacitor and a primary winding in a transformer. A charge storage capacitor is connected to a secondary winding of the transformer through a starting switch and polarity changeover switch, and an AC power supply for charging is connected through a diode to the charge storage capacitor.

9 Claims, 1 Drawing Figure

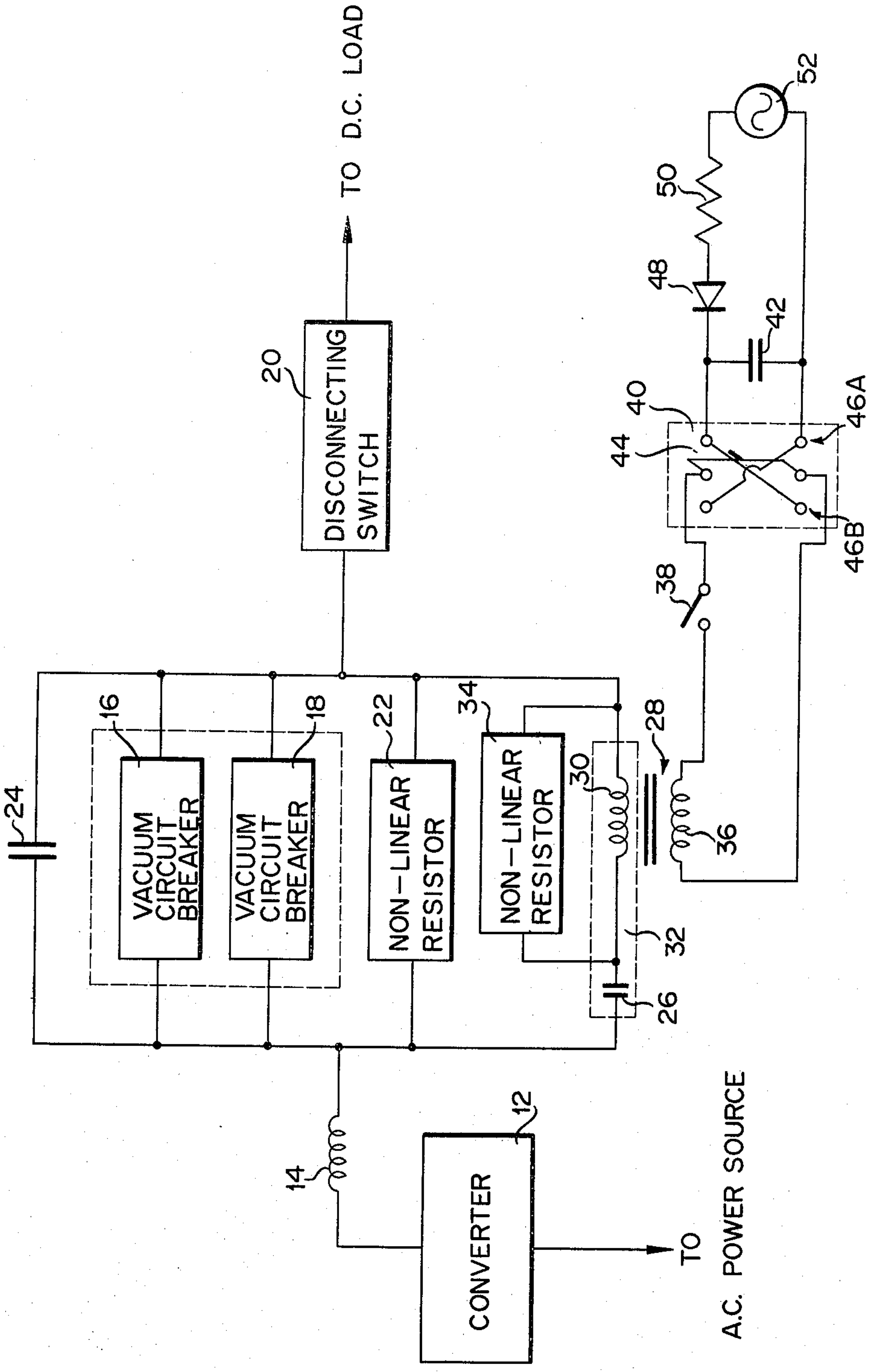
TO D.C. LOAD
DISCONNECTING SWITCH
20
VACUUM CIRCUIT BREAKER
VACUUM CIRCUIT BREAKER
NON-LINEAR RESISTOR
NON-LINEAR RESISTOR
16
18
22
24
26
28
30
32
34
36
38
40
42
44
46A
46B
48
50
52
CONVERTER
12
14
TO A.C. POWER SOURCE

CIRCUIT BREAKER APPARATUS FOR HIGH VOLTAGE DIRECT CURRENTS

BACKGROUND OF THE INVENTION

1. Field of the Invention

This invention relates to a circuit breaker apparatus for high voltage direct currents in which a great current of high voltage is interrupted by a current limiting system.

2. Description of the Prior Art

An electric power is conventionally transmitted in the form of alternating current, but a direct current transmission system has recently been used in place of such alternating current transmission system. In the direct current transmission system an electric power is transmitted in the form of a great current of high voltage and great care must be exercised when such great current is interrupted. Recent tendency is toward an increase in power transmission capacity.

At the current interruption time, a greater surge voltage is induced in an current interrupter. The surge voltage tends to be increased as the power transmission capacity is increased. If the power transmission capacity is so increased, a greater mechanical shock is imparted to the current interrupter at the current interruption time or a very high heat is generated in the current interrupter at the current interruption time, leading to damage or injury to the current interrupter. For this reason, a strong demand is made for a circuit breaker apparatus for high voltage direct currents which is high in safety and capable of positive current interruption.

SUMMARY OF THE INVENTION

It is accordingly the object of this invention to provide an economic circuit breaker apparatus which is capable of safer and more positive current interruption and involves no damage or injury to a current interrupter.

According to this invention there is provided a circuit breaker apparatus for high voltage direct currents which is connected in series with an external circuit comprised of an AC-DC converting means and a DC reactor connected to the AC-DC converting means, the circuit breaker apparatus comprising a circuit breaker, a disconnecting switch connected in series with the circuit breaker, a transformer, a series circuit connected in parallel with the circuit breaker and comprised of a blocking capacitor and a primary winding in the transformer, and a secondary winding circuit comprised of a secondary winding in the transformer, a charge storage capacitor connected to a power supply for charge storage and a starting switch connected between the secondary winding and the charge storage capacitor and adapted to be operated when the current interrupter is interrupted, in which the blocking capacitor interrupts the passage of a main current at the power supplying or receiving time and serves to permit an induction current induced in the primary winding in the transformer to be passed at the current interruption time of the current interrupter.

The drawing shows a circuit breaker apparatus according to the embodiment of this invention.

BRIEF DESCRIPTION OF THE DRAWING

A circuit breaker apparatus for high voltage direct currents according to this invention is shown in the drawing.

DESCRIPTION OF THE PREFERRED EMBODIMENT

Reference numeral 12 shows a converter connected to an AC power supply not shown to convert an alternating current to a direct current. A DC reactor 14 is connected to the output terminal of the converter. The converter 12 and DC reactor 14 constitutes an external circuit. The circuit breaker apparatus of this invention is connected in series with the external circuit and comprises two vaccum circuit breakers 16, 18 and a disconnecting switch 20 connected in series with the vacuum circuit breakers 16, 18. A DC load not shown is connected to the circuit switch 20. A resistor 22 and capacitor 24 are connected in parallel with the parallel circuit of the vacuum circuit breakers. The resistor 22 has a non-linear characteristic to absorb the high voltage portion of a surge current induced at the current interruption time and the capacitor 24 is adapted to alleviate the sharpness of the surge voltage. A series circuit 32 of a blocking capacitor 26 and primary winding 30 in a transformer 28 is connected in parallel with the vacuum circuit breakers 16, 18. A resistor 34 is connected in parallel with the primary winding 30 in the transformer 28 and has a nonlinear characteristic to absorb the high voltage portion of a surge voltage induced across the primary winding 30 of the transformer 28.

The resistors 22 and 34 having the nonlinear characteristic may be formed of ones having, for example, metal oxide as a main component.

A secondary winding 36 in the transformer 28 is connected to a charge storage capacitor 42 through a starting switch 38 and polarity changeover switch 40, and the starting switch 38 is closed when a current interruption operation is effected. The polarity changeover switch 40 is adapted to permit the charge storage capacitor 42 to be discharged toward the secondary winding 36 in said transformer 28 so that the polarity across the secondary winding 36 is reversed. That is, the polarity changeover switch 40 is such that when a movable contact 44 is thrown on a fixed contact 46A the capacitor 42 is discharged in one direction toward the secondary winding 36 of the transformer 28 and when the movable contact 44 is thrown on a fixed contact 46B the capacitor 42 is discharged in the opposite direction toward the secondary winding 36 of the transformer 28. An AC power supply 52 is connected through a series circuit of a diode 48 and resistor 50 to the capacitor 42 to permit the capacitor to store the charge. A diode 48 is used as a rectifying element.

The operation of the circuit breaker apparatus according to this invention will be explained below.

Upon the supply of an electric power i.e. when the converter 12 serves as a rectifier on the power supply side a main current is fed through the vacuum circuit breakers 16, 18 and disconnecting switch 20 to the DC load not shown.

Explanation will be given to the current interruption operation of the current interrupter under the abovemention power supply condition.

Suppose that the number of turns, $N_1$, of the primary winding 30 in the transformer 28 is set greater than the number of turns, $N_2$, of the secondary winding 36 in the transformer 28 and that the turn ratio "a" ($a=N_1/N_2$) satisfies $C_{42}/a^2>C_{26}$ where $C_{26}$ denotes the capacitance of the blocking capacitor 26 and $C_{42}$ the capacitance of the capacitor 42. When the current interruption operation is effected, the electrodes of the vacuum circuit breakers 16, 18 are mechanically opened, causing the electrodes of the circuit breakers 16, 18 to be electrically connected therebetween by arcing. Then, the movable contact 44 of the changeover switch 40 is selectively thrown on the fixed contact 46A or 46B dependent upon whether or not the main current flows from the converter 12 toward the DC load (i.e. the power supply time) or whether or not the main current flows from the DC load toward the converter 12 (i.e. the power receiving time). The selection as to on which side of the fixed contacts 46A, 46B the movable contact 44 of the changeover switch 40 is thrown is necessarily determined by setting the direction of the secondary current through the secondary winding in the transformer such that when the starting switch 38 is closed as will be later described a current induced in the primary winding in the transformer is flowed in the direction in which the main current flowing through the circuit breakers 16, 18 is cancelled or decreased. In this case, the polarity across the secondary winding is determined by throwing the movable contact 44 on the fixed contact side which is determined by a current interruption operation at the power supply time. That is, the conduction direction of the secondary current through the secondary winding 36 is determined. Next when the starting switch 38 is closed, the charge stored in the capacitor 42 flows through the secondary winding 36. For this reason, an induction current flows through the primary winding 30 via the blocking capacitor 26 in a direction in which the main current flowing through the circuit breakers 16, 18 is cancelled or decreased. As a result, the main current through the vacuum circuit breakers 16, 18 is decreased and becomes zero when it reaches a predetermined level. Thus, the vacuum circuit breakers 16, 18 are interrupted. In this way, the vacuum circuit breakers 16, 18 are interrupted by the current limiting system, and an electromagnetic energy is stored in the DC reactor 14. The stored electromagnetic energy is delivered to the DC load through the blocking capacitor 26, primary winding 30 in the transformer and disconnecting switch 20. At this time, however, an abrupt release of the energy is alleviated by the blocking capacitor 26. A high voltage portion of a surge voltage induced at the current interruption time is absorbed by the resistors 22 and 34. The sharp portion of the surge voltage is alleviated by the capacitor 24, thereby protecting the circuit breakers against damage, injury etc. The disconnecting switch 20 is provided to interrupt a minute current.

When the current is interrupted at the power receiving time i.e. the flow of the main current from the DC load toward the converter 12 is interrupted, it is only required that the induction current through the primary winding 30 be reversed as compared with the power supply time. To explain in more detail, the direction of the closure of the movable contact 44 may be reversed as compared with the power supply time such that the direction of the secondary current through the secondary winding 36 is reversed as compared with the power supply time.

As mentioned above, since according to this invention the blocking capacitor 26 is connected in series with the primary winding 30 in the transformer 28 the main current through the primary winding 30 is prevented by the blocking capacitor 26 from being conducted at the main current conduction time. At the current interruption time an induction current produced to decrease the main current flows through the capacitor 26, resulting in the current interruption by the current limiting system. At the current interuption time, the electromagnetic energy induced in the DC reactor 14 is delivered to the DC load through the blocking capacitor 26, primary winding 30 and disconnecting switch 20. At this time, the blocking capacitor 26 serves to alleviate an abrupt release of the electromagnetic energy. In this way, the blocking capacitor 26 serves to prevent an abrupt release of the electromagnetic energy induced in the reactor 14 and thus serves to prevent the current interrupter from being damaged at the current interruption time.

In order to cope with an increase in the current interruption capacity, the main circuit breaker arrangement is constructed of the two vacuum circuit breakers 16, 18 connected in parallel with each other and an $SF_6$ gas disconnecting switch is used as the disconnecting switch 20, thus assuring the positive current interruption, safety at the current interruption time and economy.

A charge stored in the capacitor 42 is used as an electric power necessary for the current interruption operation. Since the charge of the capacitor 42 can be instantly supplied through the closure of the starting switch 38 a rapid current interruption operation is assured.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A circuit breaker apparatus of high voltage direct currents which is connected to an external circuit comprised of AC-DC converting means connected to an AC power supply and a DC reactor connected to said converting means, comprising a circuit breaker connected in series with said external circuit, a transformer, a series circuit connected in parallel with the circuit breaker and comprising a blocking capacitor and a primary winding of said transformer, and a secondary winding circuit comprising a secondary winding in said transformer, a charge storage capacitor connected to a charge storage power supply and a starting switch connected between said secondary winding and said charge storage capacitor.

2. A circuit breaker apparatus according to claim 1, further including a disconnecting switch connected in series with said circuit breaker.

3. A circuit breaker apparatus according to claim 1, further including a polarity changeover switch adapted to permit the charge storage capacitor to be discharged toward the secondary winding in said transformer so that the polarity across the secondary winding is reversed.

4. A circuit breaker apparatus according to claim 1, further including a capacitor connected in parallel with said circuit breaker for alleviating the sharpness of a surge voltage induced when the circuit breaker is interrupted.

5. A circuit breaker apparatus according to claim 1, further including resistor means connected in parallel with the circuit breaker and having a nonlinear characteristic to absorb a high voltage portion of a surge voltage induced when said circuit breaker is interrupted.

6. A circuit breaker apparatus according to claim 1, further including resistor means connected in parallel with said primary winding of said transformer and having a nonlinear characteristic to absorb the high voltage portion of a surge voltage applied across said primary winding in said transformer.

7. A circuit breaker apparatus according to claim 5 in which said resistor means is one including metal oxide as a main component.

8. A circuit breaker apparatus according to claim 6 in which said resistor means is one including metal oxide as a main component.

9. A circuit breaker apparatus according to claim 1 in which said circuit breaker is at least one in number.

* * * * *